Aug. 10, 1937.  C. CONE  2,089,250
GLASS ANNEALING LEER
Filed Jan. 28, 1935  3 Sheets-Sheet 2

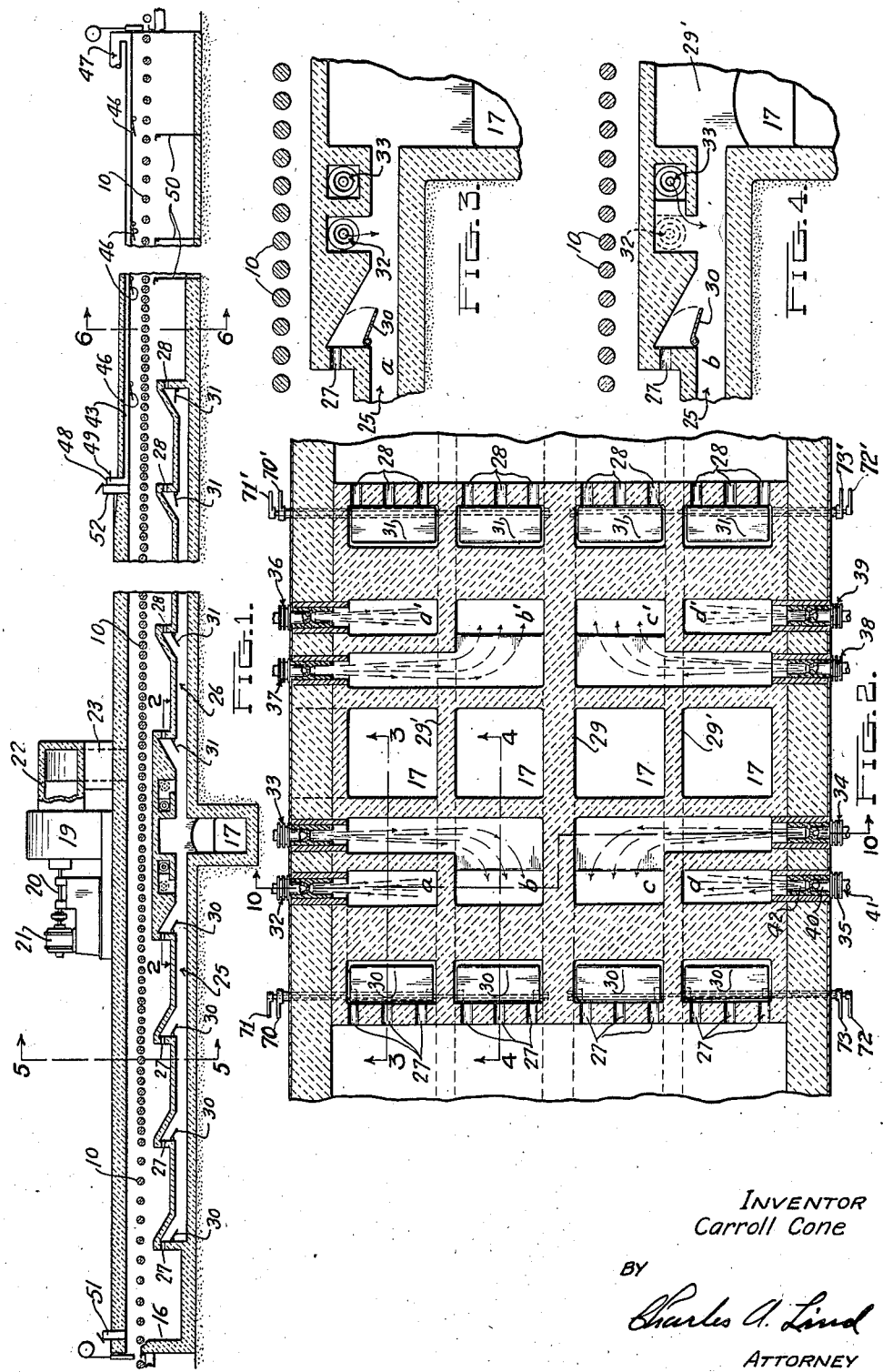

INVENTOR
Carroll Cone

BY
Charles A. Lind
ATTORNEY

Aug. 10, 1937.  C. CONE  2,089,250
GLASS ANNEALING LEER
Filed Jan. 28, 1935  3 Sheets-Sheet 3

INVENTOR
Carroll Cone

BY
Charles A. Lind
ATTORNEY

Patented Aug. 10, 1937

2,089,250

UNITED STATES PATENT OFFICE 2,089,250

GLASS ANNEALING LEER

Carroll Cone, near Toledo, Ohio, assignor to Surface Combustion Corporation, Toledo, Ohio, a corporation of New York Application January 28, 1935, Serial No. 3,799

4 Claims. (Cl. 49—47)

This invention relates to improvements in continuous glass annealing leers of the type embodying a tunnel wherethrough the glass is passed for successive heating and cooling and has for its general object to provide a leer which shall have special utility in connection with the reannealing of plate glass. One of the more particular objects of the invention is to provide for repeated heating and repeated circulation of heating gases in an improved manner in the heating zone of the tunnel. Another object is to provide improved means for effecting cooling of the glass in the cooling zone of the tunnel. Other objects of the invention will more fully appear hereinafter.

Briefly stated, the repeated heating and circulation of the heating gases are accomplished by withdrawing heating gases from the upper portion of the heating zone and reintroducing them into the lower portion of said zone through a plurality of parallelly extending conduits each having its own means for heating the gases flowing therein and each having a plurality of individually regulable outlet ports within the tunnel. The particular arrangements of parts will more fully appear hereinafter.

Briefly stated the means for effecting cooling of the glass in the cooling zone of the tunnel comprises a plurality of parallelly extending conduits in the upper portion of said zone,—air under pressure being admitted to the various conduits and each conduit having a plurality of individually regulable outlet ports in the tunnel. The particular arrangement of parts will more fully appear hereinafter.

For a more complete understanding of the invention reference is made to the detailed description taken in connection with the accompanying drawings forming part of this specification.

Referring to the drawings wherein the preferred form of the invention is shown,—

Fig. 1 is a vertical longitudinal section through the improved leer, the view being on a reduced scale as compared with the other views;

Fig. 2 is a fragmentary view in horizontal section on line 2—2 of Fig. 1;

Fig. 3 is a fragmentary view in vertical section on line 3—3 of Fig. 2;

Fig. 4 is a fragmentary view in vertical section on line 4—4 of Fig. 2;

Figure 5:
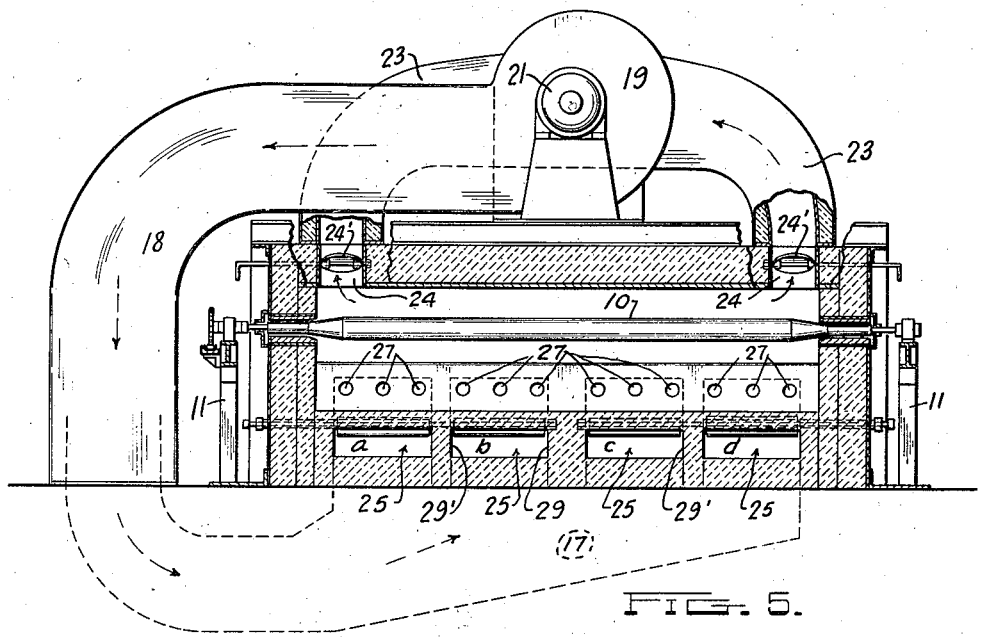
Fig. 5 is a vertical transverse section of the leer on line 5—5 of Fig. 1.
Figure 6:
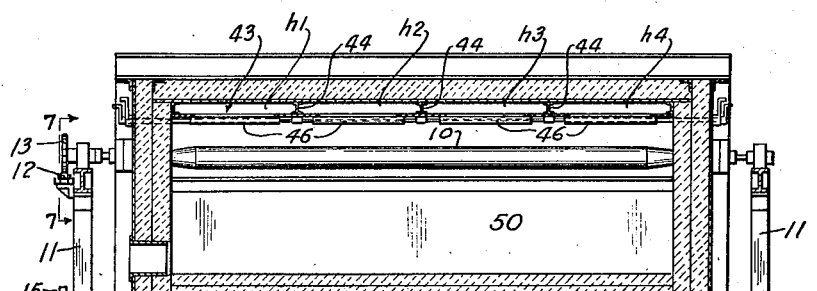
Fig. 6 is a vertical transverse section of the leer on line 6—6 of Fig. 1.
Figure 7:
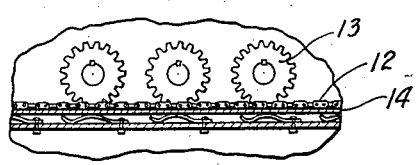
Fig. 7 is a fragmentary view in side elevation and section on line 7—7 of Fig. 6.
Figure 8:
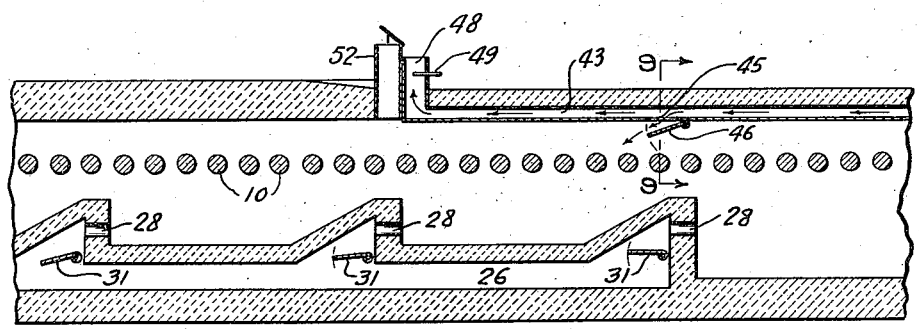
Fig. 8 is a view in vertical longitudinal section of a portion of the cooling zone of the leer.
Figure 9:
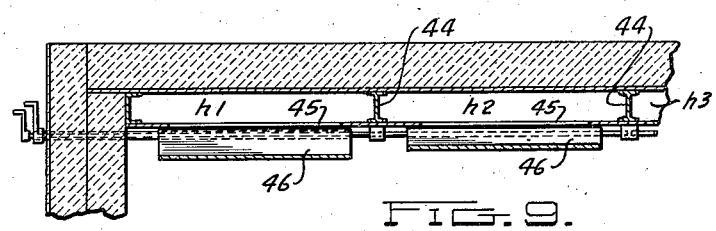
Fig. 9 is a fragmentary vertical transverse section on line 9—9 of Fig. 8.
Figure 10:
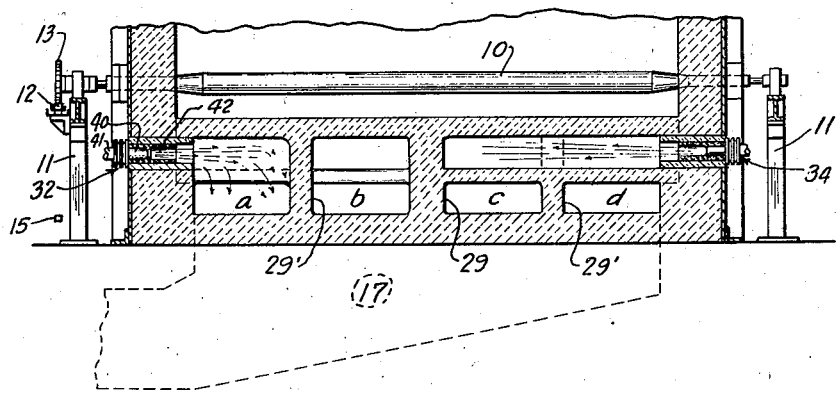
Fig. 10 is a fragmentary vertical transverse section on the irregular line 10—10 of Fig. 2.

The glass to be annealed is passed through a tunnel which is generally rectangular in cross section and which is of sufficient length to permit the glass to be successively heated and cooled in passing therethrough. The glass is passed through the tunnel by a suitable conveyor which may comprise a series of power driven rollers 10 arranged in a horizontal plane between the roof and floor of the tunnel. As viewed in Fig. 1, the left hand end of the tunnel is the glass entering end. The conveyor rolls are supported in any suitable way as on standards 11 and are driven in any suitable way as by a sprocket chain 12 which engages with sprockets 13 individual to the various rolls, the chain being supported on a cushioned runway 14 below the sprockets, the chain being part of an endless chain 15 which is driven by any suitable power means not shown.

Extending crosswise of the tunnel below the bottom thereof at a point a considerable distance inwardly from the glass entering end 16 of the tunnel is a pressure conduit 17 which extends upwardly at one side of the leer as at 18 and has its inlet in communication with the outlet side of a fan casing 19. The fan itself is not shown but its shaft is indicated at 20 and the driving motor therefor at 21. The inlet side of the fan casing includes a conduit 22 having two downwardly extending branches 23, each having an inlet 24 which opens to the interior of the tunnel through the roof thereof near the side walls of the tunnel at a point a considerable distance inwardly of the glass entering end 16 of the tunnel,—or, as shown in Fig. 1, at a point somewhat toward the right of the vertical plane of the lower conduit 17. In each inlet 24 is a damper 24' mounted on a turnable shaft for adjusting the damper. The function of the fan is to withdraw gases from the tunnel through the inlets 24 and to deliver the same under pressure to the conduit 17 for reintroduction into the tunnel in a manner presently appearing.

The conduit 17 delivers to a gas-distributing chamber comprising two oppositely extending lateral passages 25 and 26 which extend along the bottom of the tunnel towards the opposite ends of the latter,—the passage 26 being considerably longer than the passage 25. Each passage has a series of longitudinally spaced transversely extending outlets in the roof of the passage, those of the passage 25 being indicated at 27 and those of the passage 26 at 28,—it being noted that the outlets are formed in step-ups in said roof. Each of said passages comprises a plurality of parallelly extending channels which are formed by upright partition walls 29 and 29' which extend the full length of both passages,—four of such channels for each passage being shown, those of the passage 25 being indicated by letters "a" to "d" and the corresponding channels of the passage 26 by the same letters primed. The flow of gases to the various outlets of the various channels of said passages is controlled by individually adjustable dampers, those for the outlets 27 being indicated at 30 and those for the outlets 28 at 31. The individual control of the dampers 30 and 31 in the channels $a$, $b$, $c$, $d$, etc. is manipulated at the exterior of the leer by the elements 70, 71, 72, 73, etc.

The gases delivered to the passages 25 and 26 by the conduit 17 are reheated before being discharged from the outlets 27 and 28. Reheating is accomplished by admixture with hot products of combustion from fuel burners positioned in the tunnel side walls at either side of the said conduit: one burner being provided for each of the various channels which comprise said passages. The burners for the channels $a$, $b$, $c$ and $d$ are indicated at 32, 33, 34 and 35, respectively, and those for the channels $a'$, $b'$, $c'$ and $d'$ at 36, 37, 38 and 39, respectively. Each burner is regulable independently of the others and comprises a combustion tunnel 42 to which a preformed mixture of air and fuel gas is supplied under pressure by a supply pipe 41 which terminates in a chambered head 40 having a restricted discharge orifice in axial alinement with said tunnel. The gas-air mixture thus discharged into the tunnel 42 burns with great rapidity and the hot gases issue therefrom with considerable velocity.

Extending along the roof of the tunnel for a considerable distance inwardly from the glass discharge end of the tunnel is flat air conduit 43 as wide as the roof. This conduit is divided into a plurality of parallelly extending channels by upright partition walls 44. Four of such channels are shown and are identified by reference characters $h1$ to $h4$. Each of these channels is provided with a series of longitudinally spaced outlets 45, each outlet having a damper 46, the dampers being independently regulable from outside of the tunnel. The inlet end of the conduit 43 is adjacent to the glass discharge end of the leer and cooling air under pressure is supplied to the said inlet end by a supply pipe 47 leading from a blower not shown. At the far end of the conduit are vents 48, each provided with a damper 49, there being as many vents as there are channels in the conduit. It will therefore be readily appreciated that even if all of the dampers 46 of any individual channel of the conduit 43 should be closed, air may nevertheless be flowed through that particular channel by opening the damper 49 of the vent 48 associated with that particular channel. By thus dividing the conduit 43 into a plurality of parallelly extending channels and providing each channel with independently controlled outlets it will be readily appreciated that a wide range of cooling adjustment may be had. In the cooling zone of the tunnel below the conveyor rolls 10 are upright baffle walls 50 to prevent gases from channelling along the floor of cooling zone.

Since the supply of gases in the tunnel is constantly being augmented by gases from the various burners and by air from the air conduit in the cooling zone, provision is made for venting some of the gases through the roof of the tunnel. To this end there is provided near the glass entering end of the tunnel a damper-controlled vent 51 which may extend the full width of the roof. There is also provided a damper controlled vent 52 at a point somewhat nearer the glass entering end of the tunnel than the far end of the heating gas conduit 26.

The dampers 31 in the heating gas passage 26 will ordinarily be so adjusted that most of the incoming gases from the conduit 17 will flow into the heating gas passage 25 which leads toward the glass entering end of the tunnel. In general, the flow of heating gases into the tunnel will be so regulated that the temperature in the tunnel will gradually increase in a direction from the glass entering end thereof toward a point in a vertical plane which passes through the inlets 24 of the branch conduits 23 leading to the exhaust fan and from that point will gradually decrease towards the glass discharge end of the tunnel. It will be readily appreciated that since the various dampers in the right and left hand heating gas passages 26 and 25 respectively are individually adjustable, the temperature conditions in the tunnel may be readily controlled to suit almost any desired condition.

What I claim as new and desire to secure by Letters Patent is:

1. In combination, a tunnel having a ware-supporting platform therein, a gas-distributing structure extending below said platform for a substantial portion of the longitudinal extent of said tunnel and having a series of transversely extending outlet ports in its top side for the discharge of gas into the tunnel, means for withdrawing gases from the tunnel at a point intermediate the ends of said structure and for delivering such gases to said structure at a point intermediate the ends of the latter, and means for adding highly heated gases to the gases thus delivered to said structure.

2. In combination, a tunnel having a ware-supporting platform therein, a gas-distributing structure extending below said platform for a substantial portion of the longitudinal extent of said tunnel and having a series of transversely extending outlet ports in its top side for the discharge of gas into the tunnel, means for withdrawing gases from the tunnel and for delivering the same to said structure at a point intermediate the ends of the latter, means for adding highly heated gases to the gases thus delivered to said structure, said structure being longitudinally divided into a plurality of parallelly extending flow channels, and means individual to the several channels for controlling the discharge of gases therefrom.

3. In combination, a tunnel having a ware-supporting platform therein, a gas-distributing structure extending below said platform for a substantial portion of the longitudinal extent of the tunnel and being longitudinally divided into a plurality of flow channels and each channel being provided with a longitudinally extending series of outlet ports for the discharge of gas into the tunnel, means for withdrawing gases from the tunnel and for delivering the same to said structure at a point intermediate the ends of the latter for flow into said channels, and means individual to the several channels for adding highly heated gases to the gases flowing therein.

4. In combination, a tunnel having a ware-supporting platform therein, a gas-distributing structure extending below said platform for a substantial portion of the longitudinal extent of the tunnel and being longitudinally divided into a plurality of flow channels and each channel being provided with a longitudinally extending series of outlet ports for the discharge of gas into the tunnel, means individual to the several outlets ports for controlling the discharge of gas therefrom, and means intermediate the ends of said structure for delivering highly heated gases to each of the several flow channels.

CARROLL CONE.